US006840384B2

(12) United States Patent
Yurko

(10) Patent No.: US 6,840,384 B2
(45) Date of Patent: Jan. 11, 2005

(54) GATE ASSEMBLY FOR DIVERTING ARTICLES AND THE LIKE

(76) Inventor: James D. Yurko, 2618 Payne Ct., Erie, CO (US) 80516

( * ) Notice: Subject to any disclaimer, the term of this patent is extended or adjusted under 35 U.S.C. 154(b) by 127 days.

(21) Appl. No.: 10/261,529

(22) Filed: Oct. 1, 2002

(65) Prior Publication Data

US 2004/0060848 A1 Apr. 1, 2004

(51) Int. Cl.[7] .............................................. B07C 9/00
(52) U.S. Cl. .................. 209/652; 209/657; 403/65; 403/78; 403/381; 271/303
(58) Field of Search ..................... 271/303; 403/65, 403/71, 78, 381; 209/651, 652, 657, 654, 583, 584, 900, 918

(56) References Cited

U.S. PATENT DOCUMENTS

| | | | |
|---|---|---|---|
| 4,251,000 A | * | 2/1981 | Templeton .................. 209/547 |
| 4,711,357 A | * | 12/1987 | Langenbeck et al. ....... 209/565 |
| 5,135,115 A | * | 8/1992 | Miller et al. ................ 209/564 |
| 5,996,995 A | * | 12/1999 | Kim et al. ................... 271/303 |
| 6,244,594 B1 | * | 6/2001 | Araseki et al. ............. 271/293 |

FOREIGN PATENT DOCUMENTS

EP         336333 A2 * 10/1989    ............. B07C/3/06

OTHER PUBLICATIONS

Siemans*Dematic* After Market Sales, 3 pages, Apr. 18, 2002.

* cited by examiner

*Primary Examiner*—Donald P. Walsh
*Assistant Examiner*—Joseph C Rodriguez
(74) *Attorney, Agent, or Firm*—Emery L. Tracy

(57) ABSTRACT

A gate assembly for diverting substantially flat articles is provided. The gate assembly comprises a mounting bracket having an upright support member and a mounting member secured to the upright support member and a diverter vane having a slot for slidably receiving at least a portion of the upright support member of the mounting bracket. A motion mechanism secured to the mounting bracket for selectively moving the combined mounting bracket and diverter vane thereby diverting the articles to a predetermined desired location.

10 Claims, 5 Drawing Sheets

GATE ASSEMBLY FOR DIVERTING ARTICLES AND THE LIKE

BACKGROUND OF THE INVENTION

1. Field of the Invention

This invention relates generally to a gate assembly for diverting articles and the like and, more particularly, the invention relates to a gate assembly for diverting mail and other substantially flat articles in a sorting machine.

2. Description of the Prior Art

Machines for automatically sorting flat articles, such as mail, into one of an array of selected bins or compartments, are known. Typically, such sorting machines have a feeding station, including an intake drive member such as a rubber-covered wheel or belt, sensing and detecting equipment for determining the appropriate output compartment for the article to be sorted, diverting gates or other article directing mechanisms, and an array of output compartments or bins for the sorted articles. An example of a conventional sorting machine is the DBSCII sorting device, available from Siemens ElectroCom, L. P., Arlington, Tex.

To feed articles into the sorting machine, an operator positions a bundle of mail to be sorted and shakes or jostles the mail to generally align the bottom edges, making a stack, either horizontal or vertical. The operator then places the stack of mail against the feed member of the sorting machine. The feed member then feeds the articles into the sorting machine, one at a time, to be sorted in the sorting machine.

In postal and credit operations, as well as other mass document handling devices, certain documents and envelopes are coded using a bar code and/or optical character keying and printing module, and thereafter the documents are sorted by using a bar code or optical character reader and a sorter. Certain sorting systems in current use also employ image lift address verification units, which electronically recreate the address information normally found on one side of a document, piece of mail, or package.

At the output of the sorting machine, the sorted articles are routed to the appropriate receiving compartments or bins by diverter gates where the sorted articles are stacked. The feeding and sorting of articles continues until one or more of the receiving compartments become sufficiently full of a stack of sorted articles or mail. When the receiving compartment is full, an operator removes a stack of the sorted articles from the full compartment and places the stack of articles into a box. This removal of stacked articles may be termed "sweeping" of the compartment. The stack of sorted articles placed by the operator into a box can be further reprocessed through the same sorting machine, can be transferred to another sorting machine for additional sorting, or can be transported to a delivery person, such as a mail carrier, or may be transmitted for ultimate delivery to the intended location, address or recipient when all desired sorting is completed.

Although automatic sorting machines have improved prior processes for manual article sorting, the weak point of the sorting machines is the diverter gates which direct the mail or articles to the appropriate receiving compartments. The diverter gates are typically comprised of a vane pivotally mounted to a bracket controlled by a solenoid. The pivoting of the vane about the bracket diverts the articles to the desired bin or location. Over time, due to the wear of the articles passing through and against the vanes, the vane of the diverter gate frequently chips or otherwise becomes damaged and must be repaired and/or replaced. As currently designed, changing or replacing the diverter gates is a time consuming and costly endeavor since the sorting machine must be shut down during the repair and replacement of the vane.

Accordingly, there exists a need for a gate assembly for diverting articles and the like which can be easily maintained. Additionally, a need exists for a gate assembly for diverting articles and the like which has a vane mounted to a bracket with the vane being easily mounted and removed from the vane when necessary.

SUMMARY

The present invention is a gate assembly for diverting substantially flat articles. The gate assembly comprises a mounting bracket having an upright support member and a mounting member secured to the upright support member and a diverter vane having a slot for slidably receiving at least a portion of the upright support member of the mounting bracket. A motion mechanism secured to the mounting bracket for selectively moving the combined mounting bracket and diverter vane thereby diverting the articles to a predetermined desired location.

The present invention additionally includes a gate device for diverting and directing articles in a sorting machine. The gate device comprises a bracket member mounted to the sorting machine. A vane member is mounted to the bracket member with the vane member removable from and mountable to the bracket member without removing the bracket member from the sorting machine wherein combined bracket member and the vane member selectively movable to direct the articles to a predetermined desired location.

The present invention further includes a method for replacing a diverter vane in a sorting machine. The method comprises providing a bracket having an upright support member and a mounting member secured to the upright support member, releasably mounting the diverter vane on at least a portion of the upright support member of the bracket, and releasably securing the diverter vane on the bracket.

DETAILED DESCRIPTION OF THE PREFERRED EMBODIMENTS

Figure 1:
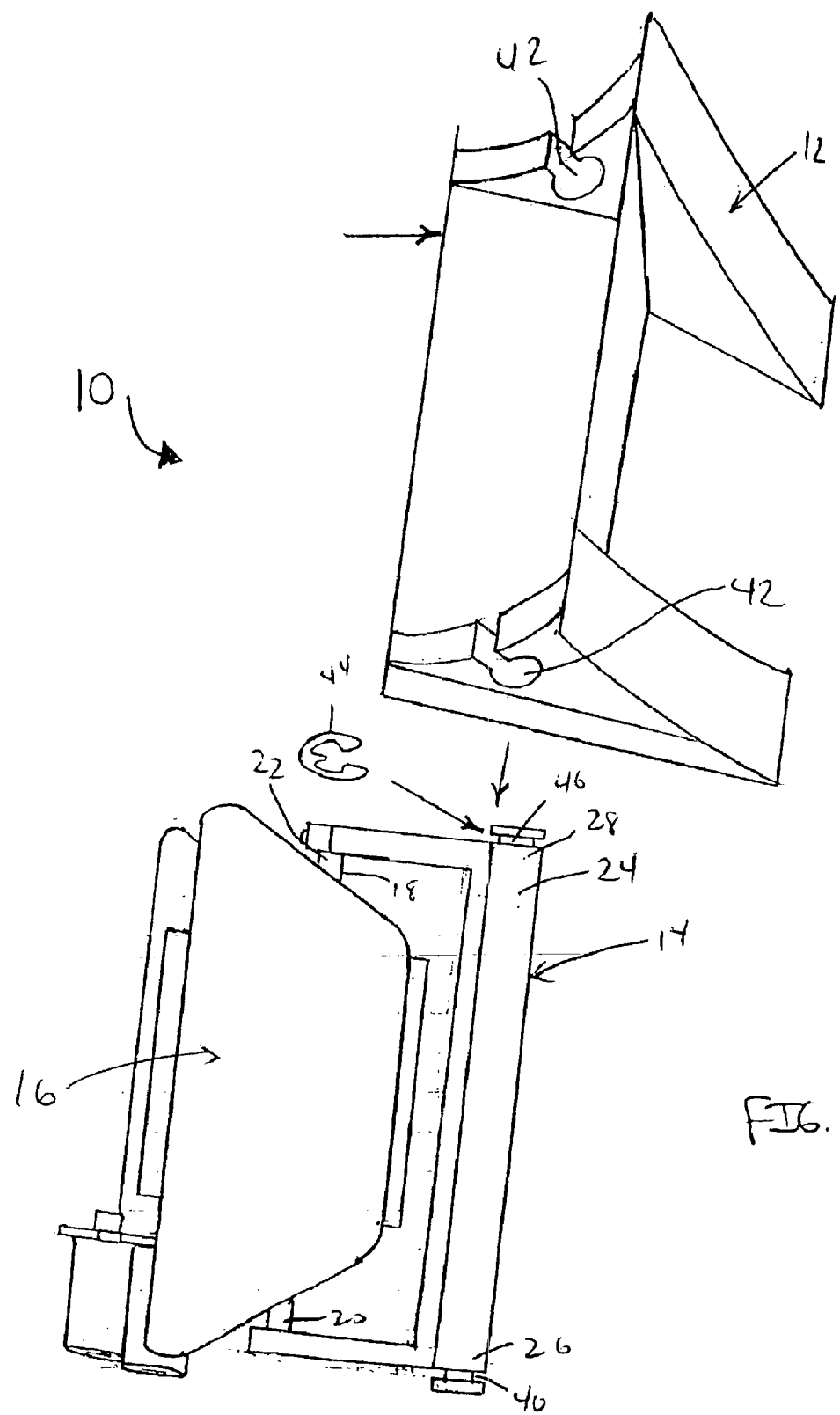
FIG. 1 is an exploded perspective view illustrating a gate assembly, constructed in accordance with the present invention, with the gate assembly having a diverter vane mountable to a mounting bracket.
Figure 2:
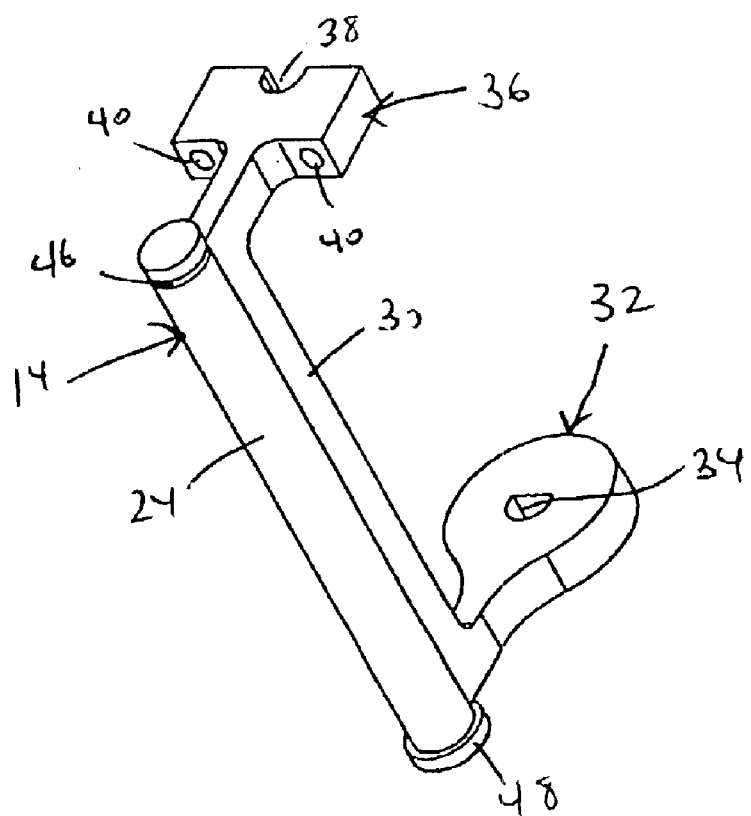
FIG. 2 is a perspective view illustrating the mounting bracket of the gate assembly, constructed in accordance with the present invention.
Figure 3:
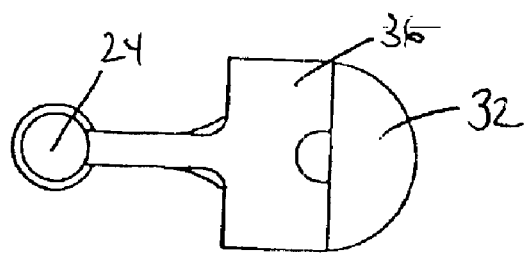
FIG. 3 is a top view illustrating the mounting bracket of the gate assembly of FIG. 2, constructed in accordance with the present invention.
Figure 4:
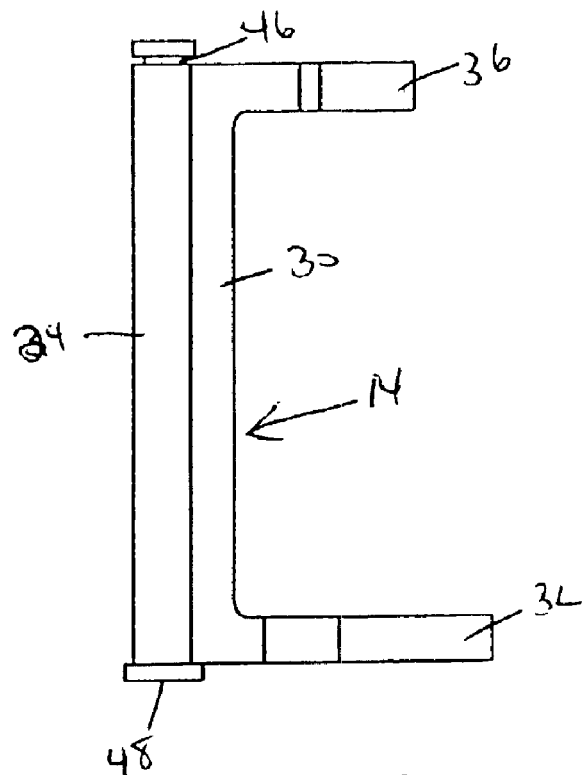
FIG. 4 is a side view illustrating the mounting bracket of the gate assembly of FIG. 2, constructed in accordance with the present invention.
Figure 5:
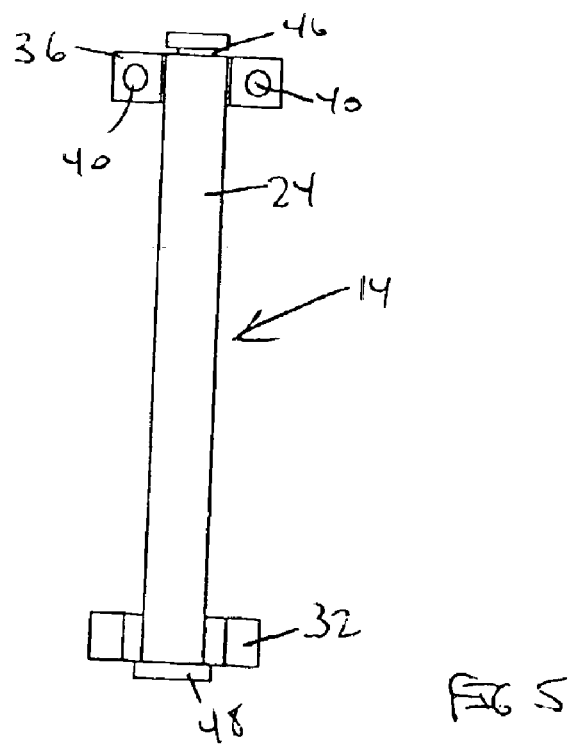
FIG. 5 is an end view illustrating the mounting bracket of the gate assembly of FIG. 2, constructed in accordance with the present invention.
Figure 6:
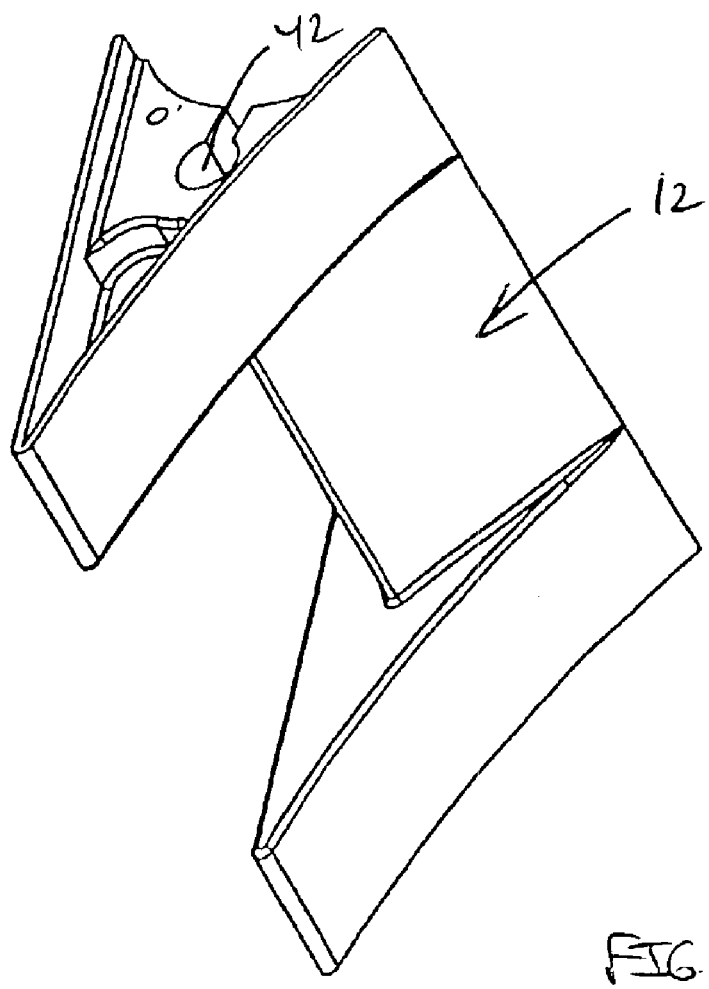
FIG. 6 is a perspective view illustrating the vane of the gate assembly, constructed in accordance with the present invention.
Figure 7:
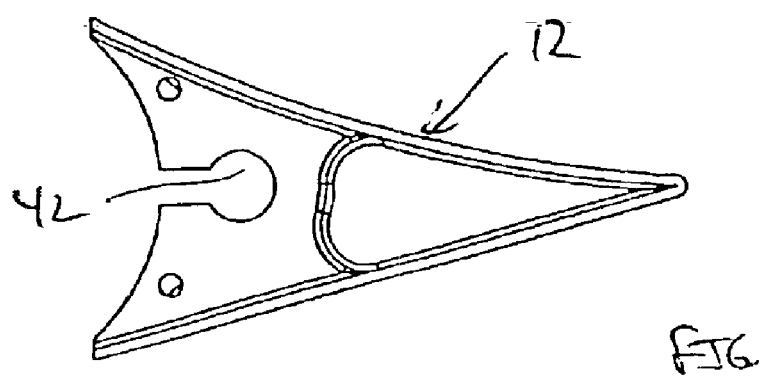
FIG. 7 is a top view illustrating the diverter vane of the gate assembly of FIG. 6, constructed in accordance with the present invention.
Figure 8:
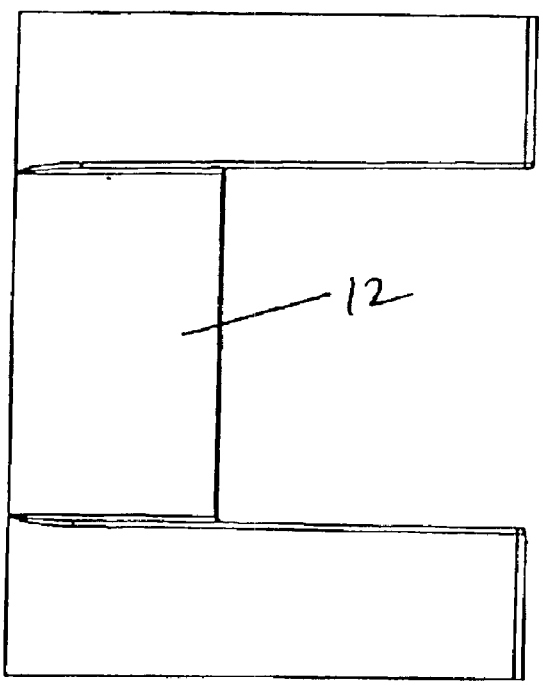
FIG. 8 is a side view illustrating the diverter vane of the gate assembly of FIG. 6, constructed in accordance with the present invention.
Figure 9:
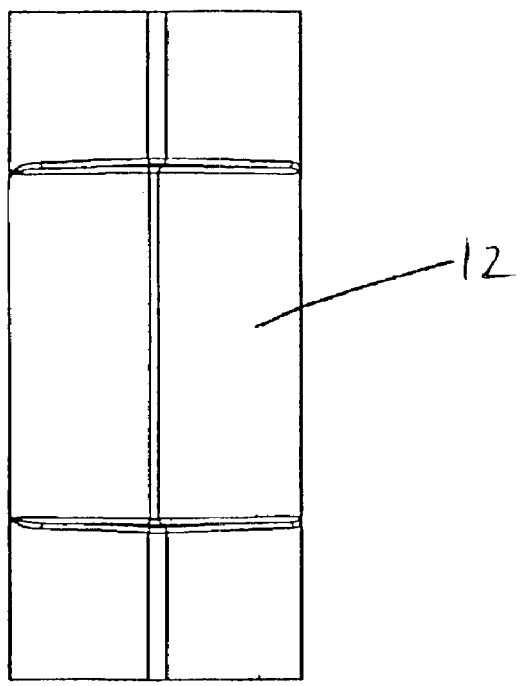
FIG. 9 is an end view illustrating the diverter vane of the gate assembly of FIG. 6, constructed in accordance with the present invention.

As illustrated in FIG. 1, the present invention is a gate assembly, indicated generally at 10, for diverting substantially flat articles (not shown) and the like during sorting and/or distribution of the substantially flat articles. The gate assembly 10 of the present invention can be used on automatic sorting machines (not shown) and other machines used for diverting and sorting substantially flat articles such as mail, checks, invoices, papers, etc.

The gate assembly 10 of the present invention includes a diverter vane 12 mountable to a mounting bracket 14. The diverter vane 12 and the mounting bracket 14 are preferably constructed from a plastic material although constructing the diverter vane 12 and the mounting bracket 14 from other materials including, but not limited to, metal, ceramic, wood, etc., is within the scope of the present invention.

Still referring to FIG. 1, the mounting bracket 14 is mounted to a solenoid 16 or other control means for controlling the movement of the mounting bracket 14 and the diverter vane 12 relative to the solenoid 16. The solenoid 16 includes sufficient electronics causing and controlling the selective movement of the mounting bracket 14 and diverter vane 12 to direct the substantially flat articles to a predetermined, desired destination.

The solenoid 16 further includes a rotatable mounting post 18 for receiving the mounting bracket 14. As the solenoid 16 rotates the mounting post 18 in response to commands for particular article movement, the mounting bracket 14 also moves accordingly. A spring member (not shown) is positioned between the solenoid 16 and the mounting post 18 causing the mounting bracket 14 to return to a start position after the selective movement by the solenoid 16.

The mounting post 18 of the solenoid 16 has a first mounting post end 20 and a second mounting post end 22. As illustrated in FIGS. 2–5, the mounting bracket 14 includes a substantially circular upright support 24 having a first end 26 and a second end 28 and a mounting body 30 secured to the upright support 24 along the length of the upright support 24. First mounting means 32 are formed on the mounting body 30 adjacent the first end 26 of the upright support 24. The first mounting means 32 preferably includes a D-shaped aperture 34 for receiving the first mounting post end 20 of the mounting post 18. Preferably, the first mounting post end 20 of the mounting post 18 has a similar configuration to allow a snug fit between the first mounting means 32 and the mounting post 18 such that upon rotation of the mounting post 18, the mounting bracket 14 rotates in a similar manner.

Second mounting means 36 are formed on the mounting body 30 adjacent the second end 28 of the upright support 24. The second mounting means 36 of the mounting bracket 14 preferably includes a slot 38 for receiving the second mounting post end 22 of the mounting post 18. A complementary mounting piece (not shown) is positioned about the second mounting post end 22. A pair of aligned apertures 40 in the second mounting means 36 of the mounting bracket 14 and the mounting piece receives screws (not shown) or the like for securing the second mounting post end 22 of the mounting post 18 therebetween.

Referring now to FIGS. 6–9, the diverter vane 12 includes a substantially keyhole-shaped slot 42 extending along the length of the diverter vane 12. The upright support 24 and at least a portion of the mounting body 30 of the mounting bracket 14 are received within the keyhole-shaped slot 42 of the diverter vane 12. Securement means including, but not limited to, E-rings 44, are mounted within annular grooves 46 about each end of the upright support 24 of the mounting bracket 14. The E-rings 44 limit the extent of longitudinal movement of the diverter vane 12 relative to the mounting bracket 14 when mounted thereon.

In another embodiment, the first end 26 of the upright support 24 can have an annular shoulder 48 which also limits the longitudinal movement of the diverter vane 12 relative to the mounting bracket 14. In still another embodiment, a screw or wing-nut (not shown) can be secured into the upright support 24 of the mounting bracket 14 after sliding the diverter vane 12 onto the mounting bracket 14. Once again, the diverter vane 12 is secured between the screw and the annular shoulder 48 limiting the extent of longitudinal movement of the diverter vane 12 relative to the mounting bracket 14. It should be noted that while certain manners of releasable securement of the diverter vane 12 to the mounting bracket 14 has been described, using other means to secure the diverter vane 12 to the mounting bracket 14 are within the scope of the present invention.

In operation, the solenoid 16 moves the mounting bracket 14 and the diverter vane 12 to direct the articles to the predetermined, desired location in response to commands from sensing and detecting equipment. If the mounting bracket 14 should become worn or broken, the mounting bracket 14 can be removed by loosening the screws. If the diverter vane 12 should become worn or broken, the securement means can simply be removed and the diverter vane 12 can be replaced.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A gate assembly for diverting substantially flat articles, the gate assembly comprising:

a mounting bracket having an upright support member and a mounting member secured to the upright support member;

a diverter vane having a slot for slidably receiving at least a portion of the upright support member of the mounting bracket;

motion means secured to the mounting bracket for selectively moving the combined mounting bracket and diverter vane thereby directing the articles to a predetermined desired location;

wherein the slot of the diverter vane has a substantially keyhole shaped configuration; and wherein the slot slidably receives at least a portion of the upright support member and at least a portion of the mounting member.

2. The gate assembly of claim 1 wherein the motion means has a post, and further comprising:

mounting means associated with the mounting bracket for releasably securing the mounting bracket to the post of the motion means.

3. The gate assembly of claim 1 wherein the motion means is a solenoid device.

4. The gate assembly of claim 1 wherein the upright support member of the mounting bracket has a first end and a second end, and further comprising:

securement means associated with the first end and the second end for releasably securing the diverter vane to the upright support member of the mounting bracket.

5. The gate assembly of claim 4 wherein the securement means includes a first groove about the first end of the upright support member of the mounting bracket and a second groove about the second end of the upright support member of the mounting bracket, and further including a first clip positionable within the first groove and a second clip positionable within the second groove.

6. A gate device for diverting and directing articles in a sorting machine, the gate device comprising:

a bracket member mounted to the sorting machine;

a vane member mounted to the bracket member, the vane member removable from and mountable to the bracket member without removing the bracket member from the sorting machine;

wherein the combined bracket member and the vane member are selectively movable to direct the articles to a predetermined desired location;

wherein the bracket member has an upright support member and a mounting member secured to the upright support member and the vane member has a slot for slidably receiving at least a portion of the upright support member;

wherein the slot of the vane member has a substantially keyhole shaped configuration; and wherein the slot slidably receives at least a portion of the upright support member and at least a portion of the mounting member.

7. The gate device of claim 6 wherein the upright support member of the bracket member has a first end and a second end, and further comprising:

securement means associated with the first end and the second end for releasably securing the vane member to the upright support member of the bracket member.

8. The gate device of claim 7 wherein the securement means includes a first groove about the first end of the upright support member of the bracket member and a second groove about the second end of the upright support member of the bracket member, and further including a first clip positionable within the first groove and a second clip positionable within the second groove.

9. A method for replacing a diverter vane in a sorting machine, the method comprising:

providing a bracket having an upright support member and a mounting member secured to the upright support member;

releasably mounting the diverter vane on at least a portion of the upright support member of the bracket;

releasably securing the diverter vane on the bracket;

forming a substantially keyhole shaped slot on the diverter vane;

directing the upright support member into the keyhole shaped slot thereby mounting the diverter vane on the bracket; and directing the upright support member and at least a portion of the mounting member into the keyhole shaped slot.

10. The method of claim 9, and further comprising:

forming a first groove about a first end of the upright support member;

forming a second groove about a second end of the upright support member;

positioning a first clip within the first groove; and positioning a second clip within the second groove.

* * * * *